United States Patent
Na et al.

(10) Patent No.: US 11,463,320 B2
(45) Date of Patent: Oct. 4, 2022

(54) METHOD AND APPARATUS FOR MODELING NETCONF-BASED NETWORK SYSTEM INSTRUCTIONS WITH YANG LANGUAGE

(71) Applicant: Electronics and Telecommunications Research Institute, Daejeon (KR)

(72) Inventors: Tae Heum Na, Daejeon (KR); Pyung Koo Park, Daejeon (KR); Ho Yong Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1059 days.

(21) Appl. No.: 16/127,579

(22) Filed: Sep. 11, 2018

(65) Prior Publication Data
US 2019/0132213 A1    May 2, 2019

(30) Foreign Application Priority Data

Oct. 31, 2017   (KR) ......................... 10-2017-0143273

(51) Int. Cl.
*H04L 41/14*         (2022.01)
*G06F 16/14*         (2019.01)
(Continued)

(52) U.S. Cl.
CPC .......... *H04L 41/145* (2013.01); *G06F 16/148* (2019.01); *H04L 41/0226* (2013.01); *H04L 41/0266* (2013.01); *H04L 41/0803* (2013.01)

(58) Field of Classification Search
CPC ............... H04L 41/145; H04L 41/0226; H04L 41/0266; H04L 41/0803; G06F 16/148
(Continued)

(56) References Cited

U.S. PATENT DOCUMENTS

| 7,522,299 B2 | 4/2009 | Nguyen et al. |
| 2008/0228289 A1 | 9/2008 | Hwang et al. |

(Continued)

FOREIGN PATENT DOCUMENTS

| KR | 1996-0025161 A | 7/1996 |
| KR | 2000-0061020 A | 10/2000 |

(Continued)

OTHER PUBLICATIONS

Benoit Claise, "YANG Opensource Tools for Data Modeling-driven Management", Jan. 25, 2017, https://blogs.cisco.com/getyourbuildon/yang-opensource-tools-for-data-modeling-driven-management (Year: 2017).*

(Continued)

*Primary Examiner* — Steven W Crabb
(74) *Attorney, Agent, or Firm* — NSIP Law

(57) ABSTRACT

Disclosed are a method and apparatus for modeling a network configuration protocol (NETCONF)-based network device instruction with a yet another next generation (YANG) language. The method of modeling the NETCONF-based network device instruction with the YANG language includes: searching for at least one instruction from a source file for controlling a NETCONF-based network device; parsing the retrieved instruction into a plurality of tokens; mapping each parsed token with a data type of the YANG language according to a previously defined mapping rule; and generating a YANG model corresponding to the at least one instruction according to mapping results. Accordingly, the YANG model is immediately generated reflecting changes in an instruction of a network system.

19 Claims, 20 Drawing Sheets

(51) Int. Cl.
*H04L 41/0226* (2022.01)
*H04L 41/0266* (2022.01)
*H04L 41/0803* (2022.01)

(58) Field of Classification Search
USPC .......................................................... 703/21
See application file for complete search history.

(56) References Cited

U.S. PATENT DOCUMENTS

2016/0191306 A1* 6/2016 Gasparakis ............. H04L 67/34
370/419
2017/0270157 A1* 9/2017 Porika ................... G06F 16/955

FOREIGN PATENT DOCUMENTS

| KR | 2001-0037152 A | 5/2001 |
| KR | 10-2005-0030071 A | 3/2005 |
| KR | 10-2006-0035205 A | 4/2006 |
| KR | 10-2008-0083491 A | 9/2008 |
| KR | 10-2011-0114977 A | 10/2011 |
| KR | 10-2017-0046002 A | 4/2017 |
| WO | WO 2017/177856 A1 | 10/2017 |

OTHER PUBLICATIONS

Bjorklund, Martin "YANG—A Data Modeling Language for the Network Configuration Protocol (NETCONF)." *Internet Engineering Task Force Request for Comment:6020 Category: Standards Track ISSN:2070-1721* Oct. 2010 (173 pages in English).

* cited by examiner

FIG. 4

```
NODE(CMD_NODE_INTERFACE,  ~41
CMD_NODE_CONFIG,  ~42
"interface",  ~43
"interface IFNAME",  ~44
"Enter interface node",
"Interface name WORD")  ~45
```

FIG. 5

```
CMD(CMD_NODE_CONFIG,  ~51
IPC_ACCESS,  ~52
"clock time-set <1-31> MONTH <2000-3001> HH:MM:SS",  ~53
"Configure clock time",
"Configure software time",
"date",
"Month",  ~54
"Year",
"Time",
)
```

FIG. 11

```
Terminal history size 128        ~111
<CMD_NODE_EXEC>                  ~112
  <terminal_history_size>        ~113
    <Number> 128 </Number>       ~114
    <cr>
    </cr>                        ~115
  </terminal_history_size>
</CMD_NODE_EXEC>
```

FIG. 13

```
container CMD_NODE_CONFIG {
  container clock_set {                    ~131
    leaf CurrentTime {                     ~132
      type string;
      description "Must be input as (HH:MM:SS), Current time (hh:mm:ss )" ;
    }
    leaf Day {                             ~133
      type uint8 {range "1..31";}
      description "Must be input as (1-31), Day of the month (1-31) " ;
    }
    leaf Month {                           ~134
      type string;
      description "Must be input as (MONTH), Month of the year " ;
    }
    leaf Year {                            ~135
      type uint16 {range "2013..2100";}
      description "Must be input as (2013-2100), Year " ;
    }
    leaf cr {
      type empty;                          ~136
    }
  }
}
```

```
Clock set 12:12:12 11 DEC 2017
  <CMD_NODE_CONFIG>
    <clock_set>
      <CurrentTime>12:12:12</CurrentTime>  ~141
      <Day>11</Day>
      <Month>DEC</Month>  ~142
      <Year>2017</Year>
      <cr></cr>
    <clock_set>
  </CMD_NODE_CONFIG>
```

FIG. 16

```
container CMD_NODE_CONFIG_SERVICE {
  container no_service_access {
    choice Case {
      leaf case {
        type enumeration {
          enum ssh {
            description "Must be input as (ssh),Ssh ";
          }                                              ~161
          enum telnet {
            description "Must be input as (telnet),Telnet ";
          }
        }
      }
    }
    leaf IpAddress {
      type inet:ip-address;                              ~162
      description "Must be input as (A.B.C.D),IPv4 Address ";
    }
    leaf cr {
      type empty;
    }
  }
}
```

FIG. 17

```
No service-access ssh 192.168.122.11
 <CMD_NODE_CONFIG_SERVICE>
  <no_service-access>
   <case>ssh</case>         ~171
   <IpAddress>192.168.122.11</IpAddress> ~172
   <cr></cr>
  </no_service-access>
 </CMD_NODE_CONFIG_SERVICE>
```

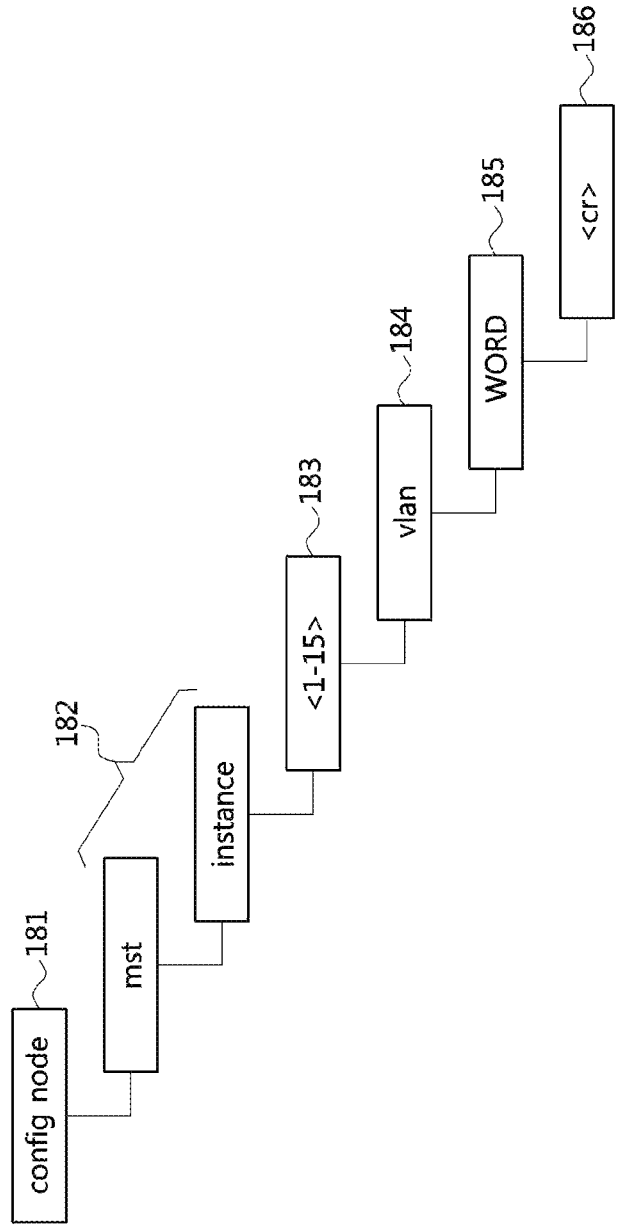

FIG. 19

```
container CMD_NODE_CONFIG_MSTP {
  container mst_instance {
    leaf Number {
      type uint8 {range "1..15";}
      description "Must be input as (1-15), Instance id" ;
    }
    container vlan {
      leaf-list WORD {
        type string;
        description "Must be input as (WORD), vid list eg 2 3 10-20" ;
      }
      leaf cr {
        type empty;
      }
    }
  }
}
```

```
mst instance 12 vlan 2 3 5 9
<CMD_NODE_CONFIG_MSTP>
  <mst_instance>
    <Number>12</Number>
    <vlan>
      <WORD>2</WORD>
      <WORD>3</WORD>
      <WORD>5</WORD>
      <WORD>9</WORD>
      <cr></cr>
    </vlan>
  </mst_instance>
</CMD_NODE_CONFIG_MSTP>
```

201 show history ~210

```
CMD_NODE_EXEC show history container CMD_NODE_EXEC {  ~221
  container show_history {  ~222
    leaf cr {
      type empty;
    }
  }
}
```

```
Show history

<CMD_NODE_EXEC>
  <show_history>
  <cr></cr>
  </show_history>
</CMD_NODE_EXEC>
```

FIG. 24

```
<?xml version="1.0" encoding="UTF-8"?>
<rpc-reply xmlns="urn:ietf:params:xml:ns:netconf:base:1.0" message-id="2">
  <ok/>  ~241
  Result  ~242
</rpc-reply>
```

FIG. 25

```
<?xml version="1.0" encoding="UTF-8"?>
<rpc-reply xmlns="urn:ietf:params:xml:ns:netconf:base:1.0" message-id="3">
  <rpc-error>  ~251
     Error message  ~252
  </rpc-error>
</rpc-reply>
```

METHOD AND APPARATUS FOR MODELING NETCONF-BASED NETWORK SYSTEM INSTRUCTIONS WITH YANG LANGUAGE

CLAIM FOR PRIORITY

This application claims priority to Korean Patent Application No. 10-2017-0143273 filed on Oct. 31, 2017 in the Korean Intellectual Property Office (KIPO), the entire contents of which are hereby incorporated by reference.

BACKGROUND

1. Technical Field

Example embodiments of the present invention relate in general to a method and apparatus for modeling a network configuration protocol (NETCONF)-based network system instruction with a yet another next generation (YANG) language, and more specifically, to a method and apparatus for generating a data model based on a YANG language so that a NETCONF-based network system instruction is controlled through an external NETCONF manager to immediately reflect changes of the instruction.

2. Related Art

State information for ensuring network connection has been generally managed by conventional network devices, but the conventional network devices have been recently required to have a configuration for applying new technology to the network device while keeping pace with changing network technology.

As one of methods to meet the requirement, a so-called simple network management protocol (SNMP) has been proposed as a management protocol for the network devices, but the SNMP has a difficulty in managing various network devices and uniformly providing necessary services to the devices. For example, in the whole system where the network devices to be managed by the SNMP are collectively configured and deleted, an SNMP agent needs to a process of collecting the configurations of the network devices and mapping the collected configurations to one system. In this case, even though the network devices are laboriously mapped to one system by being configured and deleted, operations are disabled when a system version is changed or the agent is loaded in another system.

Accordingly, the Internet engineering task force (IETF) has standardized a network configuration protocol (NETCONF) as a new protocol for a configuration of a network device. The NETCONF is a protocol that is focused on only the configuration of the network device. For example, the NETCONF may be configured to transmit an instruction from a remote management system (e.g., an NETCONF manager) to a NETCONF server in the system, thereby actually executing the instruction.

Meanwhile, the IETF has also standardized a yet another next generation (YANG) language as a language to model data for the network device configurations of NETCONF-based multi vendors. The YANG language is essential for representing data about the NETCONF-based network device, but an individual and manual process is required for modeling each individual instruction supported in the system with the YANG language.

SUMMARY

Accordingly, example embodiments of the present invention are provided to substantially obviate one or more problems due to limitations and disadvantages of the related art.

Example embodiments of the present invention provide a method of modeling a NETCONF-based network device instruction with a YANG language so as to immediately reflect changes even though the changes are made in the instruction used in a network system.

The method of modeling a network configuration protocol (NETCONF)-based network device instruction with a yet another next generation (YANG) language may comprise searching for at least one instruction from a source file for controlling a NETCONF-based network device, parsing the retrieved instruction into a plurality of tokens, mapping each parsed token with a data type of the YANG language according to a previously defined mapping rule and generating a YANG model corresponding to the at least one instruction according to mapping results.

The at least one instruction may comprise a hierarchical instruction that comprises a node instruction, and a general instruction used in each node to which entry is made by the node instruction.

The parsing of the retrieved instruction into the plurality of tokens may comprise generating an instruction tree, in which an upper node to which the retrieved instruction belongs is a parent node, each parsed token is a child node of the parent node having a tree depth corresponding to parsed order and a leaf node of the child node includes a symbol indicating an end of the instruction.

The searching for the at least one instruction may comprise searching for an instruction definition template, in which the at least one instruction is defined, from the source file.

The mapping of each parsed token with the data type of the YANG language may comprise mapping the parsed token as a container type when the parsed token is not varied depending on a user's input value.

When successive tokens among the parsed tokens consist of a string, the successive tokens may be mapped as one container type.

The mapping of each parsed token with the data type of the YANG language may comprise mapping the parsed token as a leaf type when the parsed token is varied depending on a user's input value.

When the parsed token is 'WORD,' the leaf type may comprise a parameter of string type.

When the parsed token comprises parentheses, the leaf type may comprise a parameter of integer type (uint) having an allowable input range.

The mapping of each parsed token with the data type of the YANG language may comprise mapping the parsed token as a choice type when the parsed token has a selective grammar format.

The choice type may comprise a parameter of enumeration type.

The mapping of each parsed token with the data type of the YANG language may comprise mapping the parsed token as a leaf list type when the parsed token is '.WORD.'

The YANG model may comprise a leaf type having a NULL value in a last paragraph of the YANG model.

The method of modeling a network configuration protocol (NETCONF)-based network device instruction with a yet another next generation (YANG) language may further comprise converting the at least one instruction into an extensible markup language (XML) format.

Example embodiments of the present invention also provide an apparatus for modeling a NETCONF-based network device instruction with a YANG language so as to immediately reflect changes even though the changes are made in the instruction supported in a network system.

The apparatus for modeling a network configuration protocol (NETCONF)-based network device instruction with a yet another next generation (YANG) language may comprise at least one processor and a memory configured to store instructions for instructing the at least one processor to perform at least one operation.

The at least one operation may comprise searching for at least one instruction from a source file for controlling a NETCONF-based network device, parsing the retrieved instruction into a plurality of tokens, mapping each parsed token with a data type of the YANG language according to a previously defined mapping rule, and generating a YANG model corresponding to the at least one instruction according to mapping results.

The at least one instruction may comprise a hierarchical instruction that comprises a node instruction, and a general instruction used in each node to which entry is made by the node instruction.

The mapping of each parsed token with the data type of the YANG language may comprise mapping the parsed token as a container type when the parsed token is not varied depending on a user's input value.

When successive tokens among the parsed tokens consist of a string, the successive tokens may be mapped as one container type.

The mapping of each parsed token with the data type of the YANG language may comprise mapping the parsed token as a leaf type when the parsed token is varied depending on a user's input value.

Example embodiments of the present invention further provide a method of converting a NETCONF-based network device instruction into an extensible markup language (XML) so as to immediately reflect changes even though the changes are made in the instruction supported in a network system, thereby allowing data transmission between a NETCONF manager and a NETCONF agent.

The method of converting a network configuration protocol (NETCONF)-based network device instruction into an extensible markup language (XML) may comprise searching for at least one instruction from a source file for controlling a NETCONF-based network device, parsing the retrieved instruction into a plurality of tokens, mapping each parsed token with an XML format according to a previously defined mapping rule and generating an XML file corresponding to the at least one instruction according to mapping results.

BRIEF DESCRIPTION OF DRAWINGS

Example embodiments of the present invention will become more apparent by describing example embodiments of the present invention in detail with reference to the accompanying drawings, in which:

FIG. 4 illustrates an example of a source code in which a node entry instruction is defined according to one embodiment of the present invention;

FIG. 5 illustrates an example of a source code in which a general instruction is defined according to one embodiment of the present invention;

FIGS. 9 to 11 are example views of generating a YANG model using a general instruction of a consecutive string, and converting the generated YANG model into an XML format;

FIGS. 12 to 14 are example views of generating a YANG model using a general instruction having a grammar format required to be subjected to a special process, and converting the generated YANG model into an XML format;

FIGS. 15 to 17 are example views of generating a YANG model using a general instruction having a selective grammar format, and converting the generated YANG model into an XML format;

FIGS. 18 to 20 are example views of generating a YANG model using a general instruction including a plurality of words, and converting the generated YANG model into an XML format;

FIGS. 24 and 25 are example views showing an XML definition including a result response for the output instruction of FIG. 21;

DESCRIPTION OF EXAMPLE EMBODIMENTS

Figure 1:
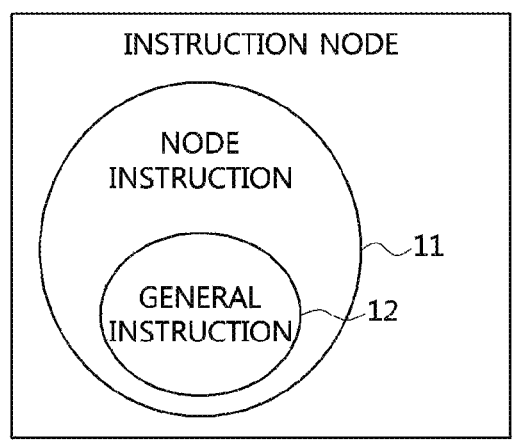
FIG. 1 is a conceptual view showing an instruction system used in a network configuration protocol (NETCONF)-based network device according to one embodiment of the present invention.

Example embodiments of the present invention are disclosed herein. However, specific structural and functional details disclosed herein are merely representative for purposes of describing the example embodiments of the present invention, however, the example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

A yet another next generation (YANG) language to be addressed in the present invention refers to a language used in modeling data for a network configuration protocol (NETCONF). A YANG module may define a data hierarchy used in various operations of the NETCONF (for example, a configuration, state data, remote procedure calls (RPCs), notification, etc.). Therefore, the YANG language makes it possible to completely represent all pieces of data transmitted between a NETCONF client and a server.

Below, embodiments of the present invention will be described in detail with reference to the accompanying drawings.

FIG. 1 is a conceptual view showing an instruction system used in a NETCONF-based network device according to one embodiment of the present invention.

Referring to FIG. 1, instructions used in the NETCONF-based network device may be grouped into one or more instruction nodes. As an example of the instruction node, there may be a config node as a node for execution of an instruction or a configuration of a network device, a view node as a node for displaying a state of a network system, an enable node as a node for identifying an operation state of the network system, etc.

Further, the node instructions of the nodes includes a node instruction 11 as an instruction for entering a corresponding node, and a general instruction 12 to be used in the corresponding node when an entry to the node is made by the node instruction 11.

Figure 2:
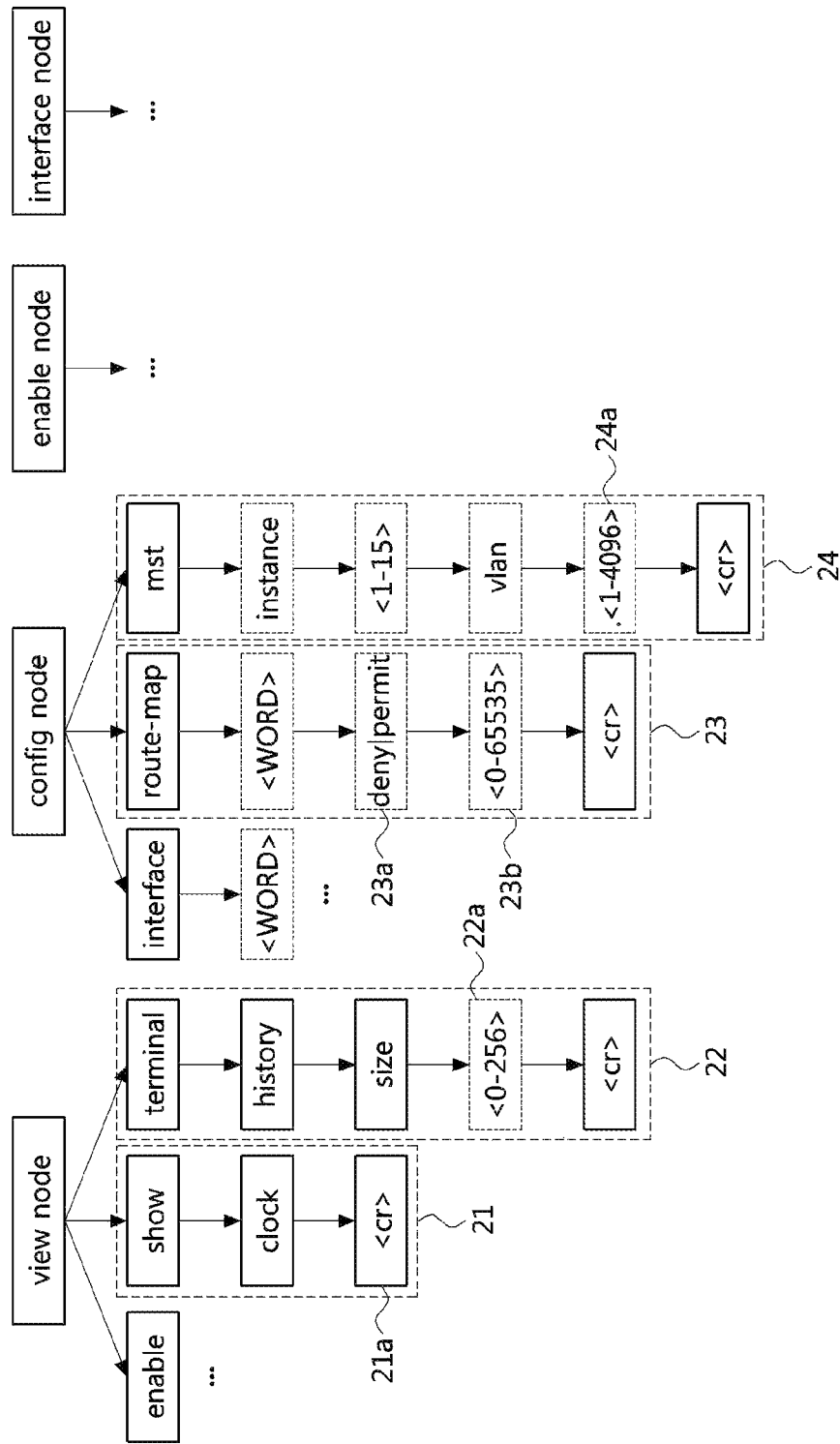
FIG. 2 is an example view showing a tree structure of an instruction used in the NETCONF-based network device according to one embodiment of the present invention.

FIG. 2 is an example view showing a tree structure of an instruction used in the NETCONF-based network device according to one embodiment of the present invention.

FIG. 2 illustrates an example in which the general instructions for various instruction nodes described in FIG. 1, such as the view node, the config node, the enable node, and an interface node, are parsed into tokens in accordance with character strings, and each token is configured as one node in the tree structure.

Specifically, referring to a general instruction in the view node, an instruction 21 of "show clock" may be parsed into two tokens such as "show" and "clock," and "clock" may be formed as a child node of "show" subsequent to "show." In this case, "<cr>" 21a is included as a leaf node at the end of the instruction. Like this, each instruction includes "<cr>" at the end thereof, and therefore, it is possible to identify the end of the instruction. Next, referring to another general instruction in the view node, an instruction 22 of "terminal history size <0-256>" has a tree structure in order of "terminal," "history," and "size." In this case, "<0-256>" 22a may be a configuration value from 0 to 256.

Referring to a general instruction in the config node, an instruction 23 of "route-map <WORD> deny|permit <0-65535>" includes a string 23a including a mark '|', in which "deny|permit" means that either of "deny" or "permit" may be the corresponding node. Like as described above, "<0-65535>" 23b may be a configuration value.

Referring to another general instruction in the config node, an instruction 24 of "mst instance <1-15> vlan.<1-4096>" includes a node 24a of "<1-4096>." The node 24a of "<1-4096>" may mean that multiple values between 1 and 4096 are addable.

Below, a method of modeling the network device instructions, having the hierarchical structure as shown in FIGS. 1 and 2, with the YANG language will be described in detail.

Figure 3:
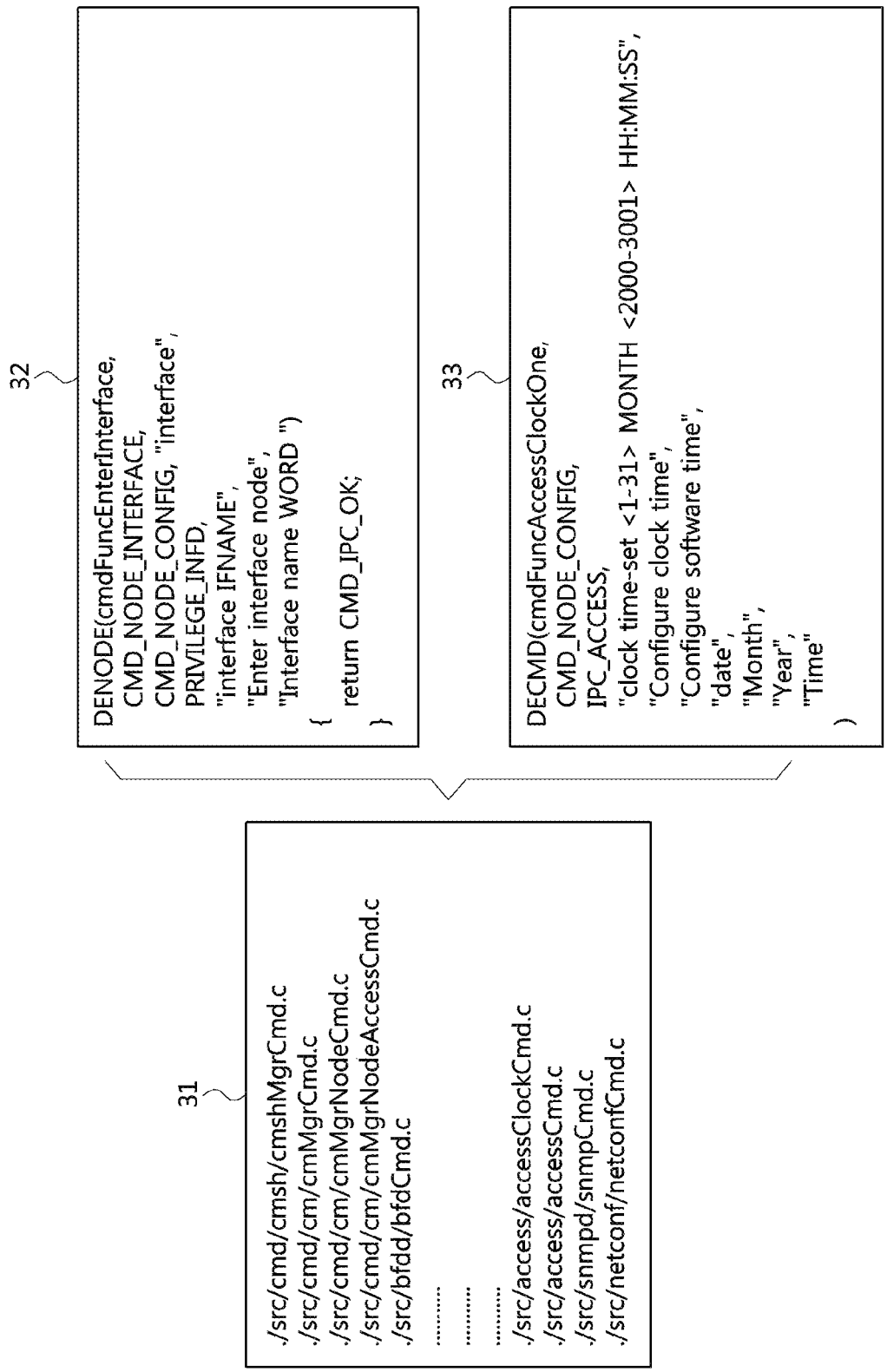
FIG. 3 is an example view of searching for NETCONF-based network device instructions from a source file according to one embodiment of the present invention instruction.

FIG. 3 is an example view of searching for NETCONF-based network device instructions from a source file according to one embodiment of the present invention instruction. FIG. 4 illustrates an example of a source code in which a node entry instruction is defined according to one embodiment of the present invention. FIG. 5 illustrates an example of a source code in which a general instruction is defined according to one embodiment of the present invention;

Referring to FIG. 3, NETCONF-based network devices may find a source file whose name includes 'cmd' or which ends in 'cmd' among various source code files 31. For example, 'cmshMgrCmd.c,' 'cmMgrCmd.c,' and the like may be retrieved.

By searching for the retrieved source file, an instruction definition template, in which an instruction is defined, may be retrieved. Here, the instruction definition template may include a DENODE 32 where the node entry instruction is defined or a DECMD 33 where the general instruction is defined. Here, the instruction definition template refers to a template where a grammar format or the like of the instruction is defined, and the instruction definition template may be denoted by different terms according to a network operating system (OS). According to the present invention, such terms will be collectively referred to as an instruction definition template.

Referring to FIG. 4, an example of defining the node entry instruction is given, in which the definition of the node entry instruction may include an upper node name 41, a node name 42, a prompt type 43 for notifying the node entry, a defined node entry instruction 44, and a token unit description (help string) 45 about the node entry instruction 44.

That is, the node entry instruction of "interface IFNAME" 44 is defined. In this case, referring to the help string 45, it is ascertained that 'interface' in the node entry instruction 44 means the entry into the interface node, and 'IFNAME' means the name of the interface node.

Referring to FIG. 5, an example of defining the general instruction is given, in which the definition of the general instruction may include an upper node name 51, a name 52 of a software component that owns an instruction, a grammar type 53 of the defined general instruction, and a token unit description (helping string 54) about the defined instruction.

That is, referring to the token unit description 54, it is ascertained that 'clock' in the grammar type of the defined general instruction of "clock time-set <1-31> MONTH <2000-3001> HH:MM:SS" indicates a instruction to configure time of the network device, 'time-set' indicates a configuration for software time, '<1-31>' indicates a day to be configured, 'MONTH' indicates a month to be configured, '<2000-3001>' indicates a year to be configured, and 'HH:MM:SS' indicates hours, minutes, and seconds to be configured.

Figure 6:
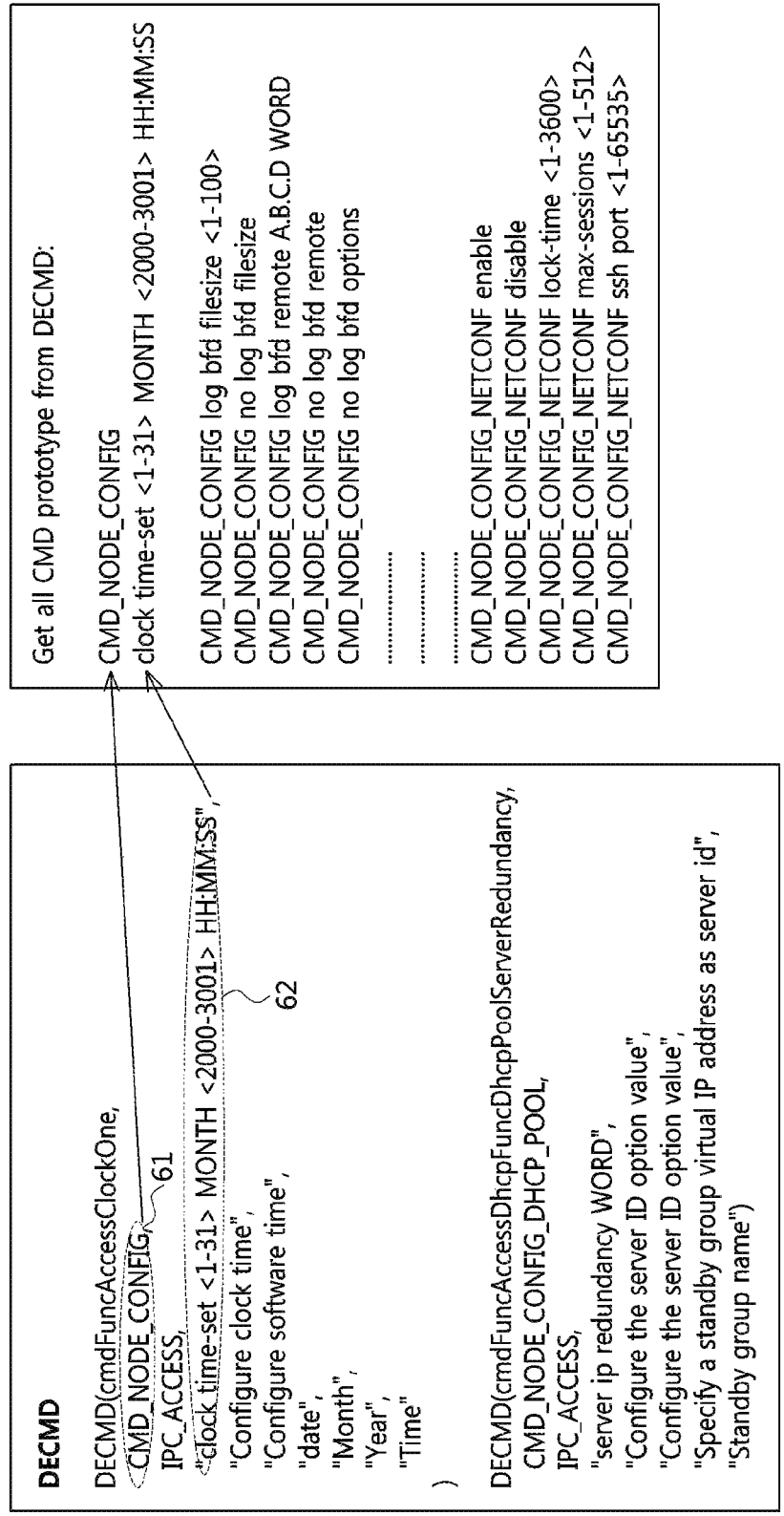
FIG. 6 is an example view showing a process of obtaining prototypes of various instructions using instruction definitions identified in the source code about the NETCONF-based network device.

FIG. 6 is an example view showing a process of obtaining prototypes of various instructions using the instruction definition identified in the source code about the NETCONF-based network device.

FIG. 6 illustrates an instruction definition template such as 'DECMD'. In this case, it is ascertained that an instruction is issued for a certain node 61, and a grammar type 62 is obtained for the corresponding general instruction.

For example, a configuration part (CMD_NODE_CONFIG) indicating the general instruction of 'CONFIG NODE' and a configuration part indicating "clock time-set <1-31> MONTH <2000-3001> HH:MM:SS" as the grammar type of the general instruction may be obtained.

This acquisition process may be performed for every part, in which the instruction is defined, in the source code files, and the obtained grammar type and the upper nodes are aggregated to generate the instruction template as shown in FIG. 6. Here, the generated instruction template is then referred to in modeling each instruction with the YANG language.

Figure 7:
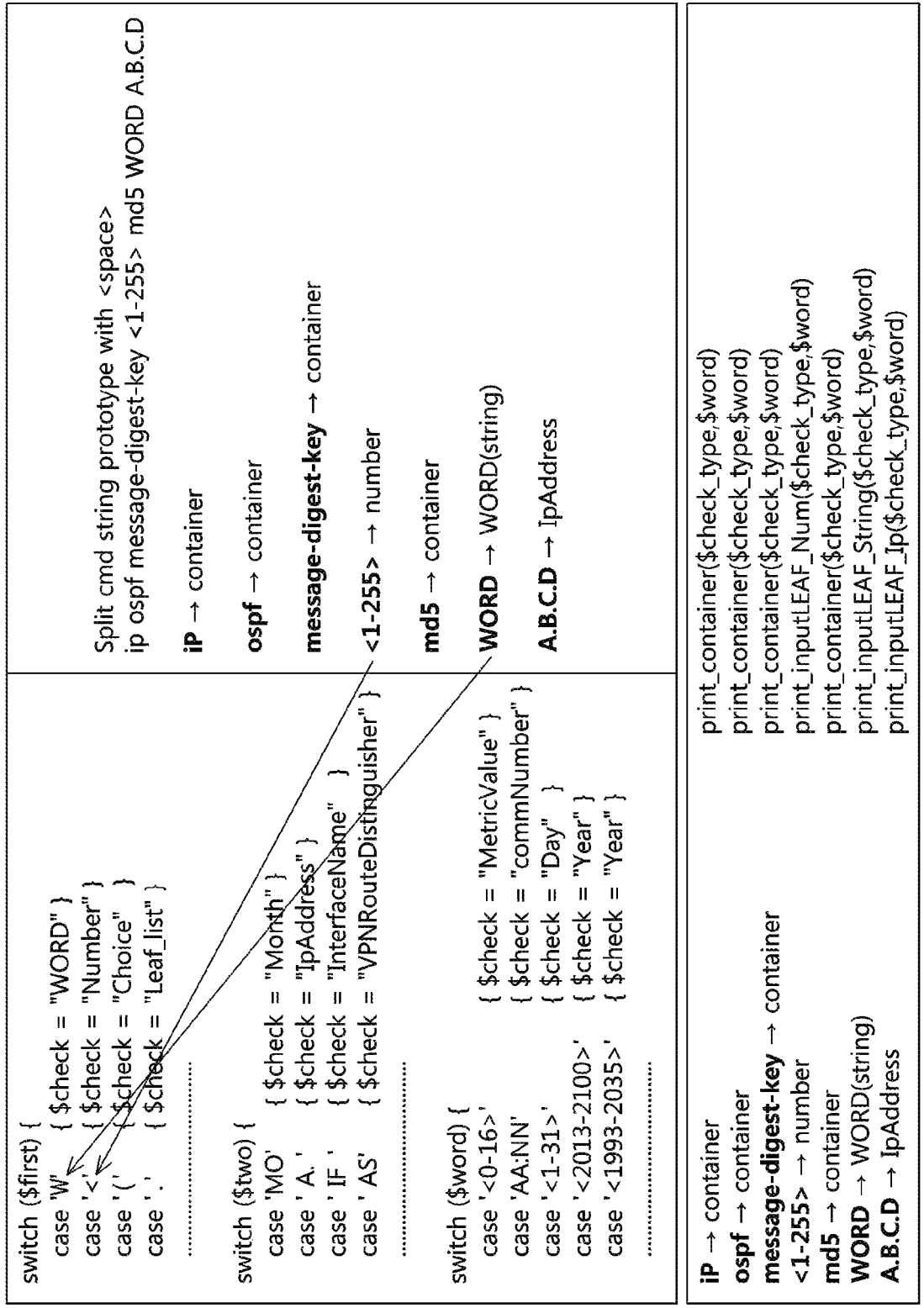
FIG. 7 is an example view showing a mapping relationship for modeling the NETCONF-based network device instruction according to one embodiment of the present invention with a yet another next generation (YANG) language.
Figure 8:
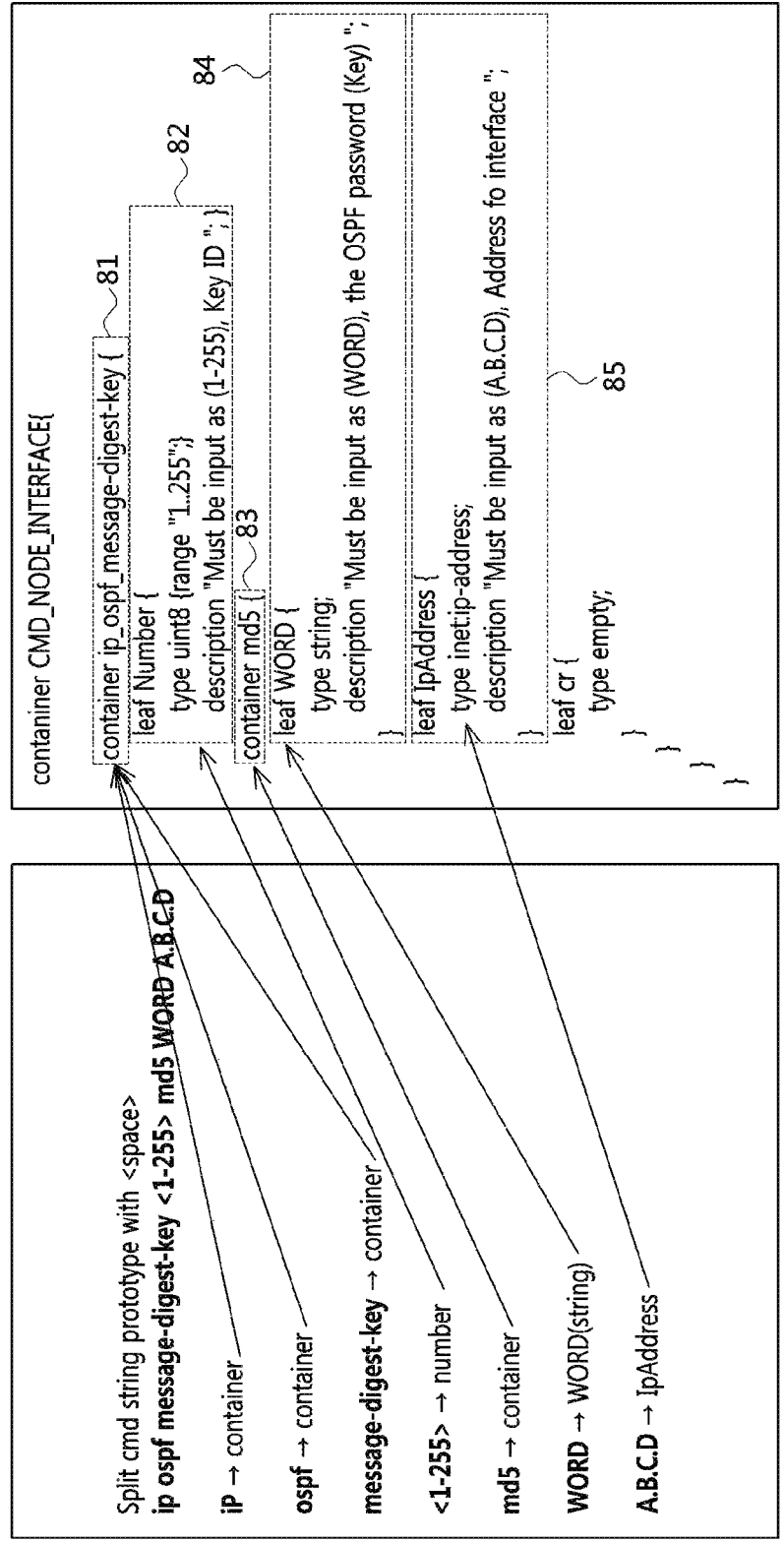
FIG. 8 is an example view showing a YANG model based on the mapping relationship of FIG. 7.

FIG. 7 is an example view showing a mapping relationship for modeling the NETCONF-based network device instruction according to one embodiment of the present invention with a YANG language. FIG. 8 is an example view showing a YANG model generated by the mapping relationship of FIG. 7;

Referring to FIG. 7, one of the grammar types of many general instructions, e.g., "ip ospf message-digest-key <1-255> md5 WORD A.B.C.D," will be given to help understanding of a mapping relationship with a data model according to the YANG language.

First, when tokens 'ip,' 'ospf,' and 'message-digest-key' in the grammar type include a consecutive string, that is, a part of the instruction includes a consecutive string, the tokens forming the consecutive string may be mapped as a container type of the YANG language since the tokens does not separately include a parameter.

Further, a parenthesized token like '<1-255>' may be recognized at only a part of '<,' and the corresponding token may be mapped as a number type of the YANG language. Here, the parentheses have to be construed as including not only '<' or '>' but also various parentheses such as '('and'),' '{' and '},' etc.

Further, a token 'WORD,' which means a certain string, may be mapped as a WORD type of the YANG language.

Further, a token 'A.B.C.D,' which means a certain IP address, may be mapped as an IpAddress type of the YANG language.

FIG. 8 illustrates the YANG model generated by mapping as shown in FIG. 7.

Specifically, it is as ascertained that the tokens of the consecutive string, such as 'ip,' 'ospf,' and 'message-digest-key' are mapped as one container type 81, and the token '<1-255>' is mapped as a leaf type 82. In this case, the leaf type 82 may internally include a parameter of unit8 type, which ranges from 1 to 255, and a description about the corresponding token.

Further, as a string, the token 'Md5' may be mapped string as a container type 83, and the token 'WORD' may be mapped as a leaf type 84. The mapped leaf type 84 may internally include a parameter of string type, and a description about the corresponding string.

Further, the token 'A.B.C.D' may be mapped as a leaf type 85, and the mapped leaf type 85 may internally include a parameter of inet:ip-address type, and a description about an IP address. In this case, the parameter of inet:ip-address type may be replaced by a parameter of Ipv4 address type, i.e., a parameter of inet:ipv4-address type.

Below, a mapping relationship will be described for each instruction, and a process of converting the mapped and generated YANG model into an extensible markup language (XMLe) format will be described.

Figures 9, 10:
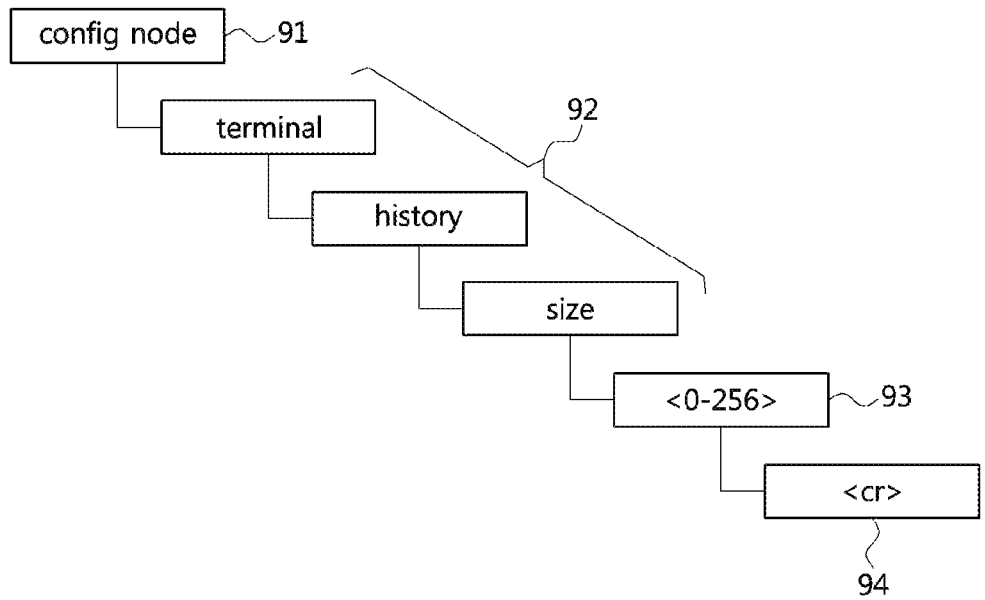

FIGS. 9 to 11 are example views of generating a YANG model using a general instruction of a consecutive string, and converting the generated YANG model into an XML format;

Referring to FIG. 9, a defined instruction grammar format "terminal history size <0-256>" may have an instruction tree including a node 91 as a config node to which a corresponding instruction belongs, tokens 92 which includes a consecutive string, a configuration value 93 which corresponds to a numeral of 0 to 256, and <cr> 94 indicating the end of the instruction.

In this case, the tokens 92 including the consecutive string do not have a value, and are thus mapped as a leaf type. To prevent the depth of the generated YANG model from deepening, the tokens 92 may be mapped as one integrated container type.

Specifically, referring to FIG. 10, the upper node identifiable with reference to a defined part in the source code of the instruction "terminal history size <0-256>" may be mapped as a container type, and the consecutive string tokens 92 may be mapped as one container type 102 at a depth lower than the mapped upper node 101.

Further, a token 93 requiring a configuration may be mapped as a leaf type 103 at a depth lower than the mapped consecutive string tokens 102. In this case, the mapped leaf type 103 may internally include an integer value 104 having a range of a configuration value, and a description 105 about the instruction. Here, the description 105 about the instruction may be filled using a help string identified in a source code paragraph in which the instruction is defined.

Next, a leaf type 106 indicating the end of the instruction may be generated in the YANG model, subsequent to the consecutive string tokens 102 mapped at a depth lower than the upper node 101. In this case, the leaf type 106 indicating the end of the instruction may be generated internally including a null value (type empty).

FIG. 11 illustrates a result from converting the YANG model generated as shown in FIG. 10 into an XML. Specifically, the name of the upper node 101 mapped to the container in FIG. 10 may be converted into <CMD_NODE_EXEC> and </CMD_NODE_EXEC>, and the consecutive string tokens 102 mapped in FIG. 10 inside the converted upper node 112 may be converted into <terminal_history_size> and </terminal_history_size> as one string 113 having a consecutive string form.

Further, the mapped configuration value 103 may be converted to indicate an actual configuration value of 128 between <Number> and </Number> inside the converted string 113, and <cr> 106 indicating the end of the instruction in the next paragraph may be converted into <cr> and </cr> 115.

Figure 12:
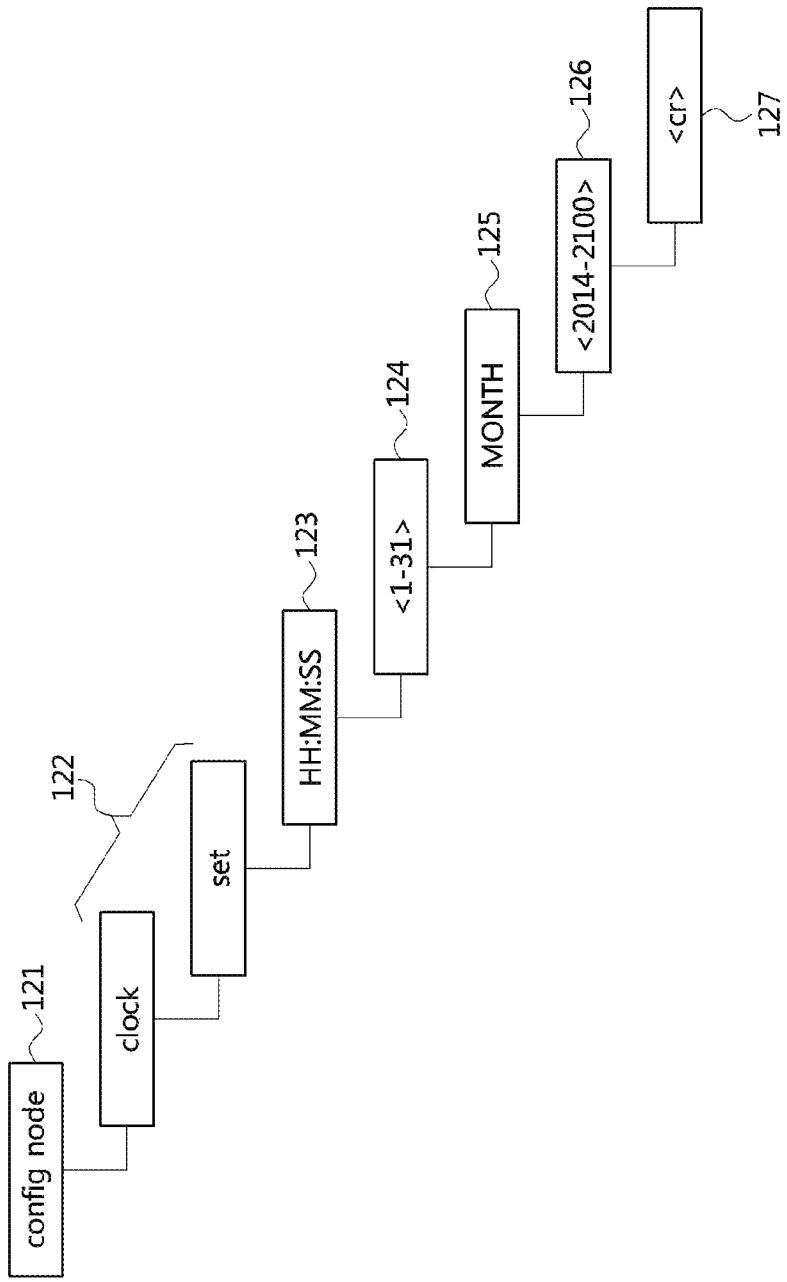
Figures 14, 15:
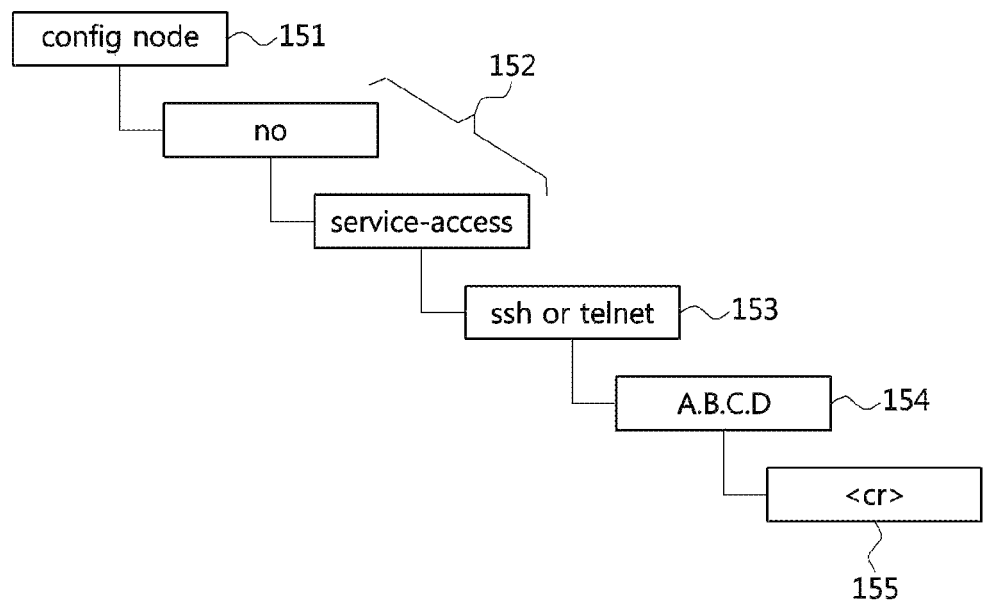

Like this, it may be necessary that the YANG model is converted into an XML format since data is exchanged in the form of the XML format between the NETCONF manager and the NETCONF agent. Since the XML conversion process is additionally performed, the present invention is immediately applicable to NETCONF-based data transmission FIGS. 12 to 14 are example views of generating a YANG model using a general instruction having a grammar format required to be subjected to a special process, and converting the generated YANG model into an XML format;

Referring to FIG. 12, an instruction tree of a defined instruction grammar format "clock set HH:MM:SS <1-31> MONTH <2013-2100>" 120 may include a node 121 as a config node to which a corresponding instruction 120 belongs, consecutive string tokens 122, a token 123 having a format indicating the time, a token 124 for indicating a configuration value (or date), a token 125 having a MONTH format for indicating a month, a token 126 for indicating a configuration value (or year), and <cr> 127 for indicating the end of the instruction.

FIG. 13 illustrates the YANG model generated by mapping the tokens shown in FIG. 12 in accordance with the YANG language format. Similar to the foregoing, the consecutive string tokens 122 of FIG. 12 may be mapped as one container type 131, and the configuration value tokens 124 and 126 indicating the date or year may be mapped as the leaf type, including an integer value having a range and a description about the integer value in the leaf type.

In particular, the token 123 having a format indicating the time and the token 125 having a MONTH format indicating a month are mapped as a leaf type, including a string and a description about the string in the leaf type.

In the last paragraph of the mapped consecutive string 131, a leaf type 136 having a NULL value like the foregoing may be included in the YANG model.

FIG. 14 illustrates a process of converting the YANG model generated as shown in FIG. 13 into an XML format, in which the mapped configuration value tokens or the upper node may be converted like the foregoing description of FIG. 11.

The token 123 having a format indicating the time and the token 125 having a MONTH format indicating a month are problematic. These tokens are generated in the YANG model as a leaf format including the string values as above, i.e., converted to have the corresponding string values as shown in strings 141 and 142 of FIG. 14.

That is, when the configuration value '12:12:12' is generated as the string value, a conversion may be made to have '12:12:12' between <CurrentTime> and </CurrentTime>. When 'DEC' is a configuration value for the MONTH token and is thus generated as a string value, a conversion may be made to include 'DEC' between <Month> and </Month>.

FIGS. 15 to 17 are example views of generating a YANG model using a general instruction having a selective grammar format, and converting the generated YANG model into an XML format.

Referring to FIG. 15, an instruction tree for the defined instruction grammar format "no service-access (ssh|telnet) A.B.C.D" 150 may include a node 151 as a config node to which the corresponding instruction 150 belongs, consecutive string tokens 152, a token 153 having a selective value, a token 154 having an IP address format, and <cr> 155 indicating the end of the instruction.

FIG. 16 illustrates the YANG model generated by mapping the tokens of FIG. 15 in accordance with the YANG language format, in which the tokens may be mapped by the same formats as described above, but the token 153 having the selective value and the token 154 having the IP address format may be problematic.

Referring to FIG. 16, the token 153 having the selective value is mapped as a choice type of the YANG language, in which the choice type may internally include an enumeration parameter to store a configuration value of the selective token 153. In this case, the enumeration parameter may include a description about each selective token as an enum type.

Further, the token 154 having the IP address format is mapped as a leaf type, and the leaf type may internally include an inet:ip-address type parameter for storing an IP address configuration value and a description about the parameter.

FIG. 17 illustrates a result from converting the YANG model of FIG. 16 into an XML format, in which a conversion 171 of the token 153 having the selective value is made to include a selected value between <case> and </case>, and a conversion 172 of the token 154 having the IP address format is made to include an IP address value between <IpAddress> and </IpAddress>.

FIGS. 18 to 20 are example views of generating a YANG model using a general instruction including a plurality of words, and converting the generated YANG model into an XML format.

Referring to FIG. 18, an instruction tree of the defined instruction grammar format "mst instance <1-15> vlan .WORD" 180 may include a node 181 as a config node to which the corresponding instruction 180 belongs, consecutive string tokens 182, a token 183 having a specific configuration value, a string token 184, a token 185 including a plurality of words like '.WORD', and <cr> 186 of indicating the end of the instruction.

Here, the above-described tokens may generate the YANG model and may be converted into the XML format by the same method as described above, but the token 185 including the plurality of words is problematic.

Referring to FIG. 19, the token 185 that may include a plurality of words is converted into a leaf-list type 191, in which the leaf-list type 191 may internally include a string parameter to store a string where a plurality of words are listed, and a description about the corresponding words.

Referring to FIG. 20, when the token 185 that may include a plurality of words is "2 3 5 9", a corresponding YANG model may be generated by the leaf-list type including one string parameter where the corresponding words are stored, and a conversion 201 of the generated string parameter may be made to include each individual word between <WORD> and </WORD>.

Figures 21, 22, 23:
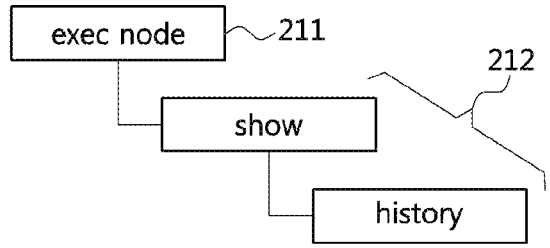
FIGS. 21 to 23 are example views of generating a YANG model using an output instruction, and converting the generated YANG model into an XML format.

FIGS. 21 to 23 are example views of generating a YANG model using an output instruction, and converting the generated YANG model into an XML format.

Here, an output instruction is an instruction to be used when a request for information is made by a NETCONF manager to a NETCONF agent, and the results are transmitted from the NETCONF agent to the manager.

FIG. 21 illustrates an instruction tree of an output instruction 210 "show history," which includes an upper node 211 about the corresponding instruction 210, and consecutive string tokens 212.

FIG. 22 illustrates the YANG model generated using the output instruction 210. For example, it is ascertained as described above that the upper node 211 is mapped as a container type 221 and the consecutive string tokens 212 are mapped as one container type 222.

FIG. 23 illustrates an example of converting the output instruction 210 into an XML format, in which the conversion of the upper node may be made into <CMD_NODE_EXEC> and </CMD_NODE_EXEC>, the conversion of the consecutive string tokens 212 may be made into <show_history> and </show_history> between the converted upper nodes, and the conversion may be made to include <cr> and </cr> indicating the end of the instruction between <show_history> and </show_history>.

FIGS. 24 and 25 are example views showing an XML definition including a result response for the output instruction of FIG. 21.

FIG. 24 illustrates an XML definition showing a result of processing the output instruction of FIG. 21. Here, <ok> and </ok> 241 for showing the processing result, e.g., the processing completion may be included, and an XML definition file may be generated to include details 242 of the process between <ok> and </ok>.

FIG. 25 illustrates XML definition showing a failure result from processing the output instruction of FIG. 21. Specifically, <rpc-error> and </rpc-error>251 for showing the processing failure result may be included, and an XML definition file may be generated to include details 252 of the error or reason between <rpc-error> and </rpc-error>.

A result response XML file generated as shown in FIG. 24 and FIG. 25 may be transmitted from the NETCONF agent to the NETCONF manager.

Figure 26:
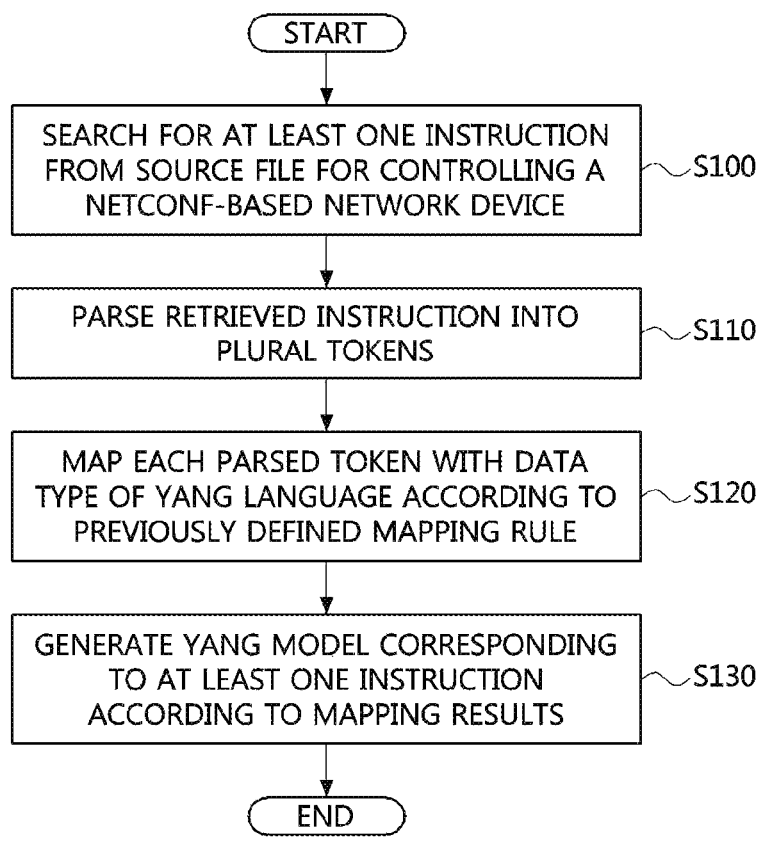
FIG. 26 is a flowchart showing a method of modeling a NETCONF-based network device instruction with a YANG language according to one embodiment of the present invention.

FIG. 26 is a flowchart showing a method of modeling a NETCONF-based network device instruction with a YANG language according to one embodiment of the present invention.

Referring to FIG. 26, the method of modeling the NETCONF-based network device instruction with the YANG language includes operation S100 of searching for at least one instruction from a source file for controlling the NETCONF-based network device, operation S110 of parsing the retrieved instruction into a plurality of tokens, operation S120 of mapping each parsed token with a data type of the YANG language in accordance with a previously defined mapping rule, and operation S130 of generating a YANG model corresponding to the at least one instruction in accordance with the mapping results.

Here, the at least one instruction may be an hierarchical instruction that includes a node instruction, and a general instruction used in each node to which entry is made by the node instruction.

Here, the operation of parsing the retrieved instruction into the plurality of tokens may include an operation of generating an instruction tree, in which an upper node to which the retrieved instruction belongs is a parent node, each parsed token is a child node of the parent node having a tree depth corresponding to parsed order, and a leaf node of the child node includes a symbol for indicating the end of the instruction. Here, the symbol for indicating the end of the instruction may be '<cr>.' Further, the term 'node' in the parent node, the child node, and the leaf node should be construed as a term for indicating each component in the tree structure unlike the foregoing instruction system including the node instructions.

Here, the operation of searching for the at least one instruction may include an operation of searching for a definition template, in which the at least one instruction is defined, from the source file.

Here, the operation of mapping each parsed token with the data type of the YANG language may include an operation of mapping the parsed tokens as a container type when the parsed tokens are not varied depending on a user's input value.

Cases in which the parsed tokens are varied and not varied depending on a user's input value will be as follows. For example, when the instruction has a grammar format "terminal history size," since the instruction is not changed according to user input and anyone can input text itself based on the grammar format, the parsed tokens (i.e. terminal, history, size) are not varied depending on a user's input value.

On the other hand, when the instruction has a grammar format "clock time-set <1-31> MONTH <2000-3001> HH:MM:SS," any user has to literally input the parsed tokens 'clock' and 'time-set,' but the parsed tokens are varied depending on user's instructions with regard to '<1-31>' and 'MONTH' because any number among natural numbers between 1 and 31 may be input with regard to '<1-31>', and a value of indicating a month such as DEC may be input with regard to 'MONTH.'

Therefore, the tokens, of which the values may vary depending on a user's input values, is mapped as a leaf type including the corresponding value as a parameter, and the other tokens are mapped as a container type.

Here, when the successive tokens among the parsed tokens consist of a string, the successive tokens may be mapped as one container type.

Here, the operation of mapping the parsed tokens with the data type of the YANG language may include an operation of mapping the parsed tokens as a leaf type when the parsed tokens are varied depending on a user's input value.

Here, when the parsed token is 'WORD,' the leaf type may include a parameter of string type.

Here, when the parsed token includes parentheses, the leaf type may include a parameter of integer type (uint) having an allowable input range. For example, when the parsed token is '<1-255> (with '<' or '>' as the parentheses), it may be mapped as a leaf type having a parameter of 'uint8 {range "0 . . . 256";} type'. Here, the parentheses may include various parentheses characters such as '('and'),' '{'and'}' as well as '<' or '>.' Here, the operation of mapping each parsed token with the data type of the YANG language may include an operation of mapping the parsed token as a choice type when the parsed token has a selective grammar format. In this case, T may indicate the selective grammar format.

Here, the choice type may include a parameter of the enumeration type.

Here, the operation of mapping each parsed token with the data type of the YANG language may include an operation of mapping the parsed token as a leaf list type when the parsed token is '.WORD.'

Here, in the YANG model, the leaf type having a NULL value may be included in the last paragraph of the YANG model.

Here, the method of modeling the NETCONF-based network device instruction with the YANG language may further include an operation of converting the at least one instruction into an XML format.

Here, when the parsed token is given in the form of "A.B.C.D," the parsed token may be mapped as a leaf type having a parameter of 'inet:ipv4-address type.'

Here, when the parsed token is given in the form of "X:X::X:X" (where, X is an arbitrary integer or an integer of 0 to 255), the parsed token may be mapped as a leaf type having a parameter of 'inet:ipv6-address type.'

Besides, the parsed token, of which the input value is varied depending on users, is mapped as a leaf type having a string type parameter in principle, but may be mapped separately as a leaf type having a different parameter with regard to some special formats described above.

Further, when the parsed token is 'INTERVAL', the parsed token may be mapped as a leaf type having an integer parameter, to which a user's input is made with regard to a time interval or numeral.

Further, when the parsed token is 'PATH,' the parsed token may be mapped as a leaf type having a string parameter, to which a user's input is made with regard to a directory path.

Figure 27:
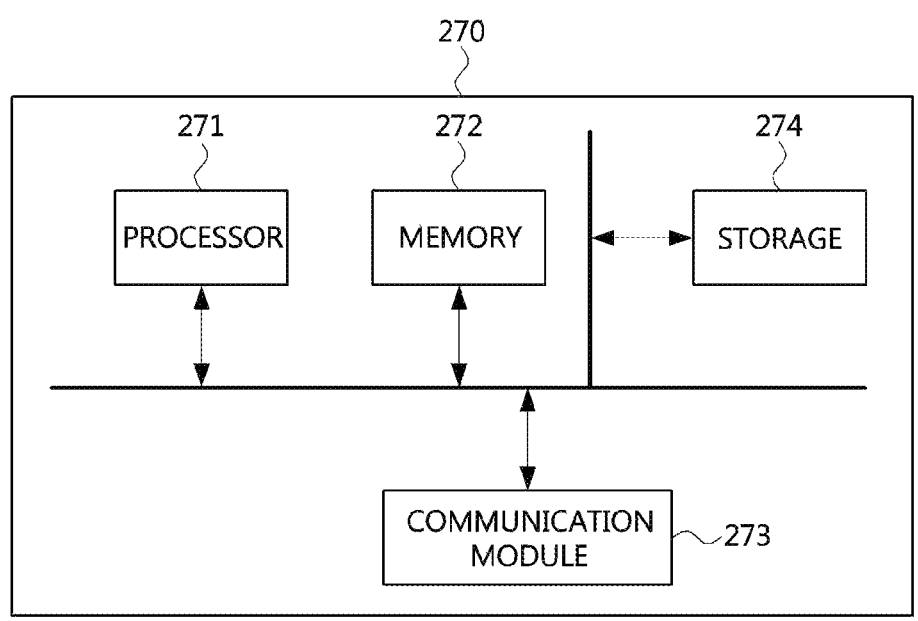
FIG. 27 is a block diagram of an apparatus for modeling a NETCONF-based network device instruction with a YANG language according to one embodiment of the present invention.

FIG. 27 is a block diagram of an apparatus for modeling a NETCONF-based network device instruction with a YANG language according to one embodiment of the present invention.

Referring to FIG. 27, an apparatus 270 for modeling the NETCONF-based network device instruction with the YANG language may include at least one processor 271, and a memory 272 configured to store instructions for instructing the at least one processor 271 to perform at least one operation.

Here, the apparatus 270 for modeling the NETCONF-based network device instruction with the YANG language may further include a communication module 273 configured to communicate with the NETCONF-based manager or agent by wired or wireless communication.

Here, the apparatus 270 for modeling the NETCONF-based network device instruction with the YANG language may further include a storage 274 configured, separately from the memory 272, to store a source file in which the instructions are defined, an instruction tree generated for the instructions, an instruction template generated for the instruction, or a YANG model generated for the instruction.

Here, the at least one operation may include an operation of searching for at least one instruction from a source file for controlling the NETCONF-based network device, an operation of parsing the retrieved instruction into a plurality of tokens, an operation of mapping each parsed token with a data type of the YANG language in accordance with a previously defined mapping rule, and an operation of generating a YANG model corresponding to the at least one instruction in accordance with the mapping results.

Here, the at least one instruction may be an hierarchical instruction that includes a node instruction, and a general instruction used in each node to which entry is made by the node instruction.

Here, the operation of mapping each parsed token with the data type of the YANG language may include an operation of mapping the parsed token as a container type when the parsed token is not varied depending on a user's input value.

Here, when the successive tokens among the parsed tokens consist of a string, the successive tokens may be mapped as one container type.

Here, the operation of mapping the parsed token with the data type of the YANG language may include an operation of mapping the parsed token as a leaf type when the parsed token is varied depending on a user's input value.

Besides, the operations of the apparatus for modeling the NETCONF-based network device instruction with the YANG language may include the foregoing operations based on the method of modeling the NETCONF-based network device instruction with the YANG language.

Here, the apparatus for modeling the NETCONF-based network device instruction with the YANG language, for example, may be a desktop computer, a laptop computer, a notebook computer, a smart phone, a tablet personal computer (PC), a mobile phone, a smart watch, smart glasses, an e-book reader, a portable multimedia player (PMP), a handheld game console, a global positioning system (GPS), a digital camera, a digital multimedia broadcasting (DMB) player, a digital audio recorder, a digital audio player, a digital video recorder, a digital video player, a personal digital assistant (PDA), and the like capable of performing communication.

Meanwhile, the method of converting the NETCONF-based network device instruction into an XML according to one embodiment of the present invention may include an operation of searching for at least one instruction from a source file for controlling the NETCONF-based network device, an operation of parsing the retrieved instruction into a plurality of tokens, an operation of mapping each parsed token with an XML format in accordance with a previously defined mapping rule, and an operation of generating an XML file corresponding to the at least one instruction in accordance with the mapping results.

Here, the operation of mapping with the XML format may be referred by the XML definition described with reference to FIGS. 9 to 25, and therefore, detailed descriptions thereof will be omitted to avoid repetitive descriptions.

Besides the method of mapping the tokens parsed from the instruction with the XML format, the foregoing method of converting the YANG model into the XML format is also available, and this method is also construed as included in the embodiments of the present invention.

With use of the foregoing method or apparatus for modeling the NETCONF-based network device instruction with the YANG language according to the present invention, the instructions (configuration, configuration deletion, information collection, error output, etc.) provided by each network device or system are directly used to generate the YANG model, thereby allowing a remote NETCONF manager to control the instruction of the actual system.

Further, the hierarchical instruction used in most of network devices is generated by the YANG model, and thus advantageously improved in extensibility.

Further, even though changes are made in the instruction to upgrade and management of the network device, the changes are immediately reflected in generating the YANG model.

While the example embodiments of the present invention and their advantages have been described in detail, it should be understood that various changes, substitutions and alterations may be made herein without departing from the scope of the invention.

What is claimed is:

1. A processor-implemented method of modeling a network configuration protocol (NETCONF)-based network device instruction with a yet another next generation (YANG) language, the method comprising:
searching for at least one instruction denoted by a term according to a network operating system from a source file for controlling a NETCONF-based network device;
searching for an instruction definition template, in which the at least one instruction is defined according to the network operating system, from the source file;
parsing the retrieved instruction into a plurality of tokens based on the instruction definition template;
mapping each parsed token with a data type of the YANG language according to a previously defined mapping rule;
generating a YANG model corresponding to the at least one instruction according to mapping results; and
controlling the NETCONF-based network device using the YANG model being generated.

2. The method of claim 1, wherein the at least one instruction comprises a hierarchical instruction that comprises a node instruction, and a general instruction used in each node to which entry is made by the node instruction.

3. The method of claim 1, wherein the parsing of the retrieved instruction into the plurality of tokens comprises generating an instruction tree, in which:
an upper node to which the retrieved instruction belongs is a parent node;
each parsed token is a child node of the parent node having a tree depth corresponding to parsed order; and
a leaf node of the child node includes a symbol indicating an end of the instruction.

4. The method of claim 1, wherein the mapping of each parsed token with the data type of the YANG language comprises mapping the parsed token as a container type when the parsed token is not varied depending on a user's input value.

5. The method of claim 4, wherein, when successive tokens among the parsed tokens consist of a string, the successive tokens are mapped as one container type.

6. The method of claim 1, wherein the mapping of each parsed token with the data type of the YANG language comprises mapping the parsed token as a leaf type when the parsed token is varied depending on a user's input value.

7. The method of claim 6, wherein, when the parsed token is 'WORD,' the leaf type comprises a parameter of string type.

8. The method of claim 6, wherein, when the parsed token comprises parentheses, the leaf type comprises a parameter of integer type (uint) having an allowable input range.

9. The method of claim 1, wherein the mapping of each parsed token with the data type of the YANG language comprises mapping the parsed token as a choice type when the parsed token has a selective grammar format.

10. The method of claim 9, wherein the choice type comprises a parameter of enumeration type.

11. The method of claim 1, wherein the mapping of each parsed token with the data type of the YANG language comprises mapping the parsed token as a leaf list type when the parsed token is '.WORD.'

12. The method of claim 1, wherein the YANG model comprises a leaf type having a NULL value in a last paragraph of the YANG model.

13. The method of claim 1, further comprising converting the at least one instruction into an extensible markup language (XML) format.

14. An apparatus for modeling a network configuration protocol (NETCONF)-based network device instruction with a yet another next generation (YANG) language, the apparatus comprising:
at least one processor; and
a memory configured to store instructions for instructing the at least one processor to perform at least one operation,
wherein the at least one operation comprises
searching for at least one instruction denoted by a term according to a network operating system from a source file for controlling a NETCONF-based network device,
searching for an instruction definition template, in which the at least one instruction is defined according to the network operating system, from the source file,
parsing the retrieved instruction into a plurality of tokens based on the instruction definition tem plate,
mapping each parsed token with a data type of the YANG language according to a previously defined mapping rule,
generating a YANG model corresponding to the at least one instruction according to mapping results, and
controlling the NETCONF-based network device using the YANG model being generated.

15. The apparatus of claim 14, wherein the at least one instruction comprises a hierarchical instruction that comprises a node instruction, and a general instruction used in each node to which entry is made by the node instruction.

16. The apparatus of claim 14, wherein the mapping of each parsed token with the data type of the YANG language comprises mapping the parsed token as a container type when the parsed token is not varied depending on a user's input value.

17. The apparatus of claim 16, wherein, when successive tokens among the parsed tokens consist of a string, the successive tokens are mapped as one container type.

18. The apparatus of claim 14, wherein the mapping of each parsed token with the data type of the YANG language comprises mapping the parsed token as a leaf type when the parsed token is varied depending on a user's input value.

19. A processor-implemented method of converting a network configuration protocol (NETCONF)-based network device instruction into an extensible markup language (XML), the method comprising:
searching for at least one instruction denoted by a term according to a network operating system from a source file for controlling a NETCONF-based network device;
searching for an instruction definition template, in which the at least one instruction is defined according to the network operating system, from the source file;
parsing the retrieved instruction into a plurality of tokens based on the instruction definition template;
mapping each parsed token with an XML format according to a previously defined mapping rule;
generating an XML file corresponding to the at least one instruction according to mapping results; and
controlling the NETCONF-based network device using the generated XML file.

* * * * *